(12) United States Patent  
Hartman et al.

(10) Patent No.: US 9,114,680 B2  
(45) Date of Patent: *Aug. 25, 2015

(54) SLIDING HITCH ASSEMBLY CAPTURE PLATE

(71) Applicant: Pulliam Enterprises, Inc., Mishawaka, IN (US)

(72) Inventors: Wayne E Hartman, Elkhart, IN (US); Randall A Pulliam, Mishawaka, IN (US)

(73) Assignee: Pulliam Enterprises, Inc., Mishawaka, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,056

(22) Filed: Feb. 12, 2014

(65) Prior Publication Data

US 2014/0159339 A1 Jun. 12, 2014

Related U.S. Application Data

(63) Continuation of application No. 13/037,003, filed on Feb. 28, 2011, now Pat. No. 8,672,340.

(51) Int. Cl.
| | |
|---|---|
| *B62D 53/06* | (2006.01) |
| *B62D 53/08* | (2006.01) |
| *B60D 1/36* | (2006.01) |
| *B60D 1/50* | (2006.01) |

(52) U.S. Cl.
CPC .............. *B60D 1/363* (2013.01); *B62D 53/061* (2013.01); *B62D 53/0814* (2013.01); *B62D 53/0828* (2013.01); *B62D 53/0842* (2013.01); *B60D 1/50* (2013.01)

(58) Field of Classification Search
CPC ........ B62D 53/00; B62D 53/06; B62D 53/08; B62D 53/0814; B62D 53/0835; B62D 53/061; B62D 53/068; B60D 1/50; B60D 1/28; B60D 1/015
USPC ............. 280/438.1, 441.1, 441.2, 417.1, 433, 280/901, 455.1, 432, 441
See application file for complete search history.

(56) References Cited

U.S. PATENT DOCUMENTS

| | | | |
|---|---|---|---|
| 1,849,240 | A | 3/1932 | McCrudden |
| 2,104,343 | A | 1/1938 | Fish |
| 3,406,852 | A | 10/1968 | Winckler |
| 4,955,631 | A | 9/1990 | Meyer |
| 5,890,728 | A * | 4/1999 | Zilm .............................. 280/433 |
| 6,065,766 | A | 5/2000 | Pulliam |
| 6,308,977 | B1 | 10/2001 | Pulliam et al. |
| 7,000,937 | B2 | 2/2006 | Dick et al. |
| 7,506,886 | B2 * | 3/2009 | Warnock .................... 280/438.1 |
| 7,654,553 | B2 | 2/2010 | Shirk |
| 7,703,792 | B1 | 4/2010 | Heitzmann et al. |
| 7,712,761 | B2 * | 5/2010 | Mater et al. .................. 280/474 |
| 7,753,392 | B2 | 7/2010 | Warnock |

(Continued)

*Primary Examiner* — Anne Marie Boehler  
(74) *Attorney, Agent, or Firm* — Botkin & Hall, LLP

(57) ABSTRACT

The present invention provides a capture plate for preventing rotation between a trailer and a hitch assembly. The hitch assembly mounts on a vehicle, and is preferably a sliding hitch assembly. The capture plate has a lip which mates with the pin box of a fifth wheel trailer, the lip prevents rotation between the trailer and the capture plate. The capture plate has a restriction part which mates with the pin slot on the hitch assembly, the restriction part restricts rotation between the capture plate and the hitch. The capture plate has a fastener which removably secures the capture plate to the pin box.

17 Claims, 13 Drawing Sheets

(56) References Cited

U.S. PATENT DOCUMENTS

| | | |
|---|---|---|
| 7,810,831 B2 | 10/2010 | Wilkens et al. |
| 8,220,818 B1 * | 7/2012 | Pulliam et al. ................ 280/441 |
| 8,672,340 B1 * | 3/2014 | Hartman et al. ........... 280/438.1 |
| 2003/0173757 A1 * | 9/2003 | Smith ........................ 280/417.1 |

* cited by examiner

SLIDING HITCH ASSEMBLY CAPTURE PLATE

CROSS-REFERENCE TO RELATED APPLICATION

This application is a continuation of and claims the benefit of priority from the prior U.S. patent application Ser. No. 13/037,003, filed on Feb. 28, 2011, now U.S. Pat. No. 8,672,340, the entire contents of which are incorporated herein by reference.

BACKGROUND OF THE INVENTION

Fifth wheel trailers and tow vehicles for fifth wheel trailers are generally well known in the art. Fifth wheel trailers are much longer, roomier, and heavier than typical tent campers and travel trailers, and thus a fifth wheel trailer typically requires a specially modified, relatively heavy tow vehicle such as a heavy duty pickup truck. The front portion of a fifth wheel trailer extends over the rear portion of the tow vehicle so that a portion of the trailer's weight can be carried over the rear axle of the tow vehicle. In order to accommodate the weight of the trailer a special hitch assembly is generally required.

One apparatus for allowing a pickup truck, even a short bed truck, to pull a fifth wheel trailer is to use a sliding hitch assembly as described in U.S. Pat. No. 6,308,977 ('977 patent). The '977 patent describes a sliding hitch assembly with two main parts, a base assembly and a hitch assembly. The hitch assembly attaches to the hitch pin of a trailer; the base assembly is mounted in the bed of a vehicle. The hitch assembly is slidably mounted on the base assembly and operates by mechanically sliding the hitch pin rearward from the cab as the trailer pivots relative to the vehicle. By sliding the hitch rearward, the distance between the hitch pin and the cab increases during turns, thereby allowing turns up to 90 degrees without the trailer contacting the cab. To allow rotation to occur between the hitch assembly and base assembly a capture plate is used to hold the hitch assembly in fixed rotational alignment with the trailer.

In the '977 patent, the sliding hitch assembly includes a capture plate which is fastened to the underside of the pin box and which mates with a cutout in the hitch pin slot of the hitch assembly, thereby restricting rotation between the hitch assembly and the pin box. The capture plate of the '977 patent is a flat piece of metal which is sized to mate with the cutout of the hitch pin slot of the sliding hitch assembly. Traditionally, the plate is either fastened directly to the pin box—such as with bolts or screws drilled into the pin box—or by welding or otherwise mounting brackets to the pin box, with the capture plate then mounted to those brackets.

Other prior art capture plates are constructed from a flat plate with a wedge extending from the bottom side. The wedge is shaped in a Y-shape and is sized to fill the pin slot on the hitch assembly, thereby preventing rotation between the capture plate and the hitch assembly. The top side of the capture plate has a lip which extends around the entire perimeter of the plate, with screws which mount through the lip and into or against the pin box, thereby preventing rotation between the capture plate and the pin box.

The previous approaches to capture plate design have some drawbacks. First, each requires modification to the pin box. Second, the traditional method of restricting rotation between the capture plate and the hitch assembly may form too strong of a connection between the trailer and the hitch assembly such that when rotational forces between the trailer and truck become excessive, costly failure can occur in the trailer, the vehicle, or the hitch. Third, pin box size can vary from trailer to trailer and thus the previous capture plate designs require customized mounting hardware for pin boxes of different dimensions.

Accordingly, there exists a need for a capture plate which can be removably mounted to a fifth wheel trailer's pin box without modifying the pin box. There also exists a need to design a capture plate which will preferentially fail so that the trailer, vehicle and hitch assembly are protected from damage when subjected to excessive stress. There further exists a need to design a capture plate which is readily and inexpensively adjustable to accommodate variously sized pin boxes.

SUMMARY OF THE INVENTION

The capture plate according to the present invention allows a fifth wheel trailer to be mounted to a sliding hitch assembly and prevents rotation therebetween. The capture plate is removably mounted on the pin box of a fifth wheel trailer and has a lip around the top edge which prevents rotation between the pin box and the capture plate. The capture plate has a protrusion feature, or wedge, affixed to the bottom side, which mates with the pin slot on a hitch assembly and serves to prevent rotation between the capture plate and the hitch assembly. Thereby, the capture plate prevents rotation between the trailer and the hitch assembly.

Accordingly, it is an object of the present invention to provide an improved capture plate which restricts rotation between a fifth wheel trailer and a sliding hitch assembly.

It is an object of the present invention to provide an improved capture plate which may be mounted to a pin box without modification to the pin box.

It is an object of the present invention to provide an improved capture plate which can be adjusted to attach to various sizes of pin boxes.

It is an object of the present invention to provide an improved capture plate which has a quick-connect fastener which anchors the capture plate to the trailer pin box.

It is another object of the present invention to provide an improved capture plate which has a lip that will preferentially fail in excessive stress situations in order to prevent damage to either the hitch assembly or the trailer.

BRIEF DESCRIPTION OF THE DRAWINGS

A preferred embodiment of this invention has been chosen wherein.

DESCRIPTION OF THE PREFERRED EMBODIMENT

The embodiment herein described does not intend to be exhaustive or to limit the invention to the precise form disclosed. It has been chosen and described to explain the principles of the invention and its application and practical use to best enable others skilled in the art to follow its teachings.

Figure 1:
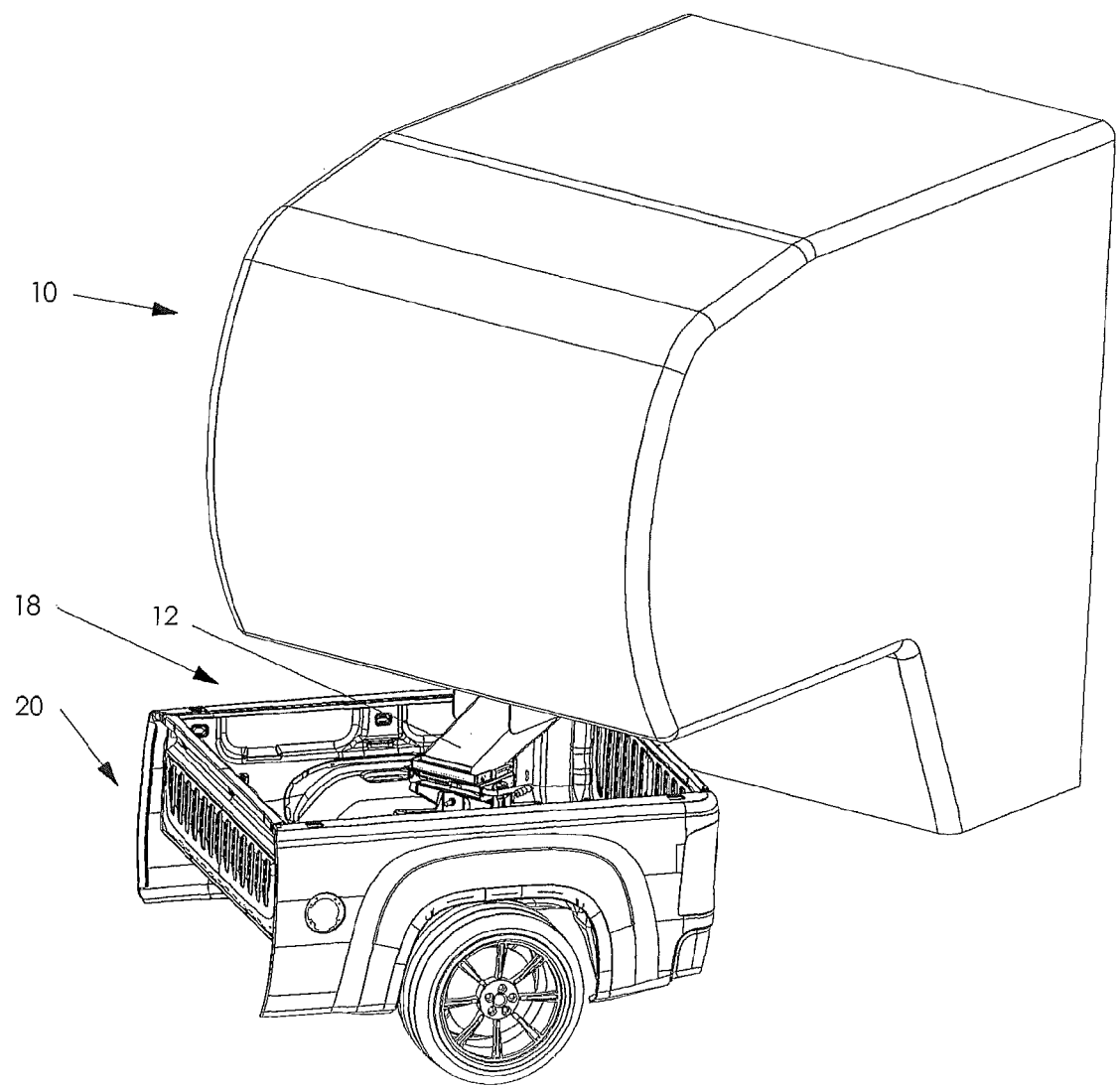
FIG. 1 is a fragmentary view of the trailer, truck and sliding hitch assembly.

FIG. 1 shows a trailer 10 connected to a sliding hitch assembly 18, which in turn is mounted to a vehicle 20. Trailer 10 includes a pin box 12 with a king pin 14 downwardly extending therefrom. King pin 14 engages a locking jaw 16 on sliding hitch assembly 18, thereby securing the trailer to the hitch assembly. Sliding hitch assembly 18 is mounted in the bed of a vehicle 20 to enable the vehicle to tow trailer 10. Vehicle 20 may be a short-bed pickup truck. The sliding hitch assembly 18 moves king pin 14 away from the cab of vehicle 20 when turning to prevent trailer 10 from contacting vehicle 20, such as shown in U.S. Pat. No. 6,308,977, incorporated herein by reference.

Figure 2:
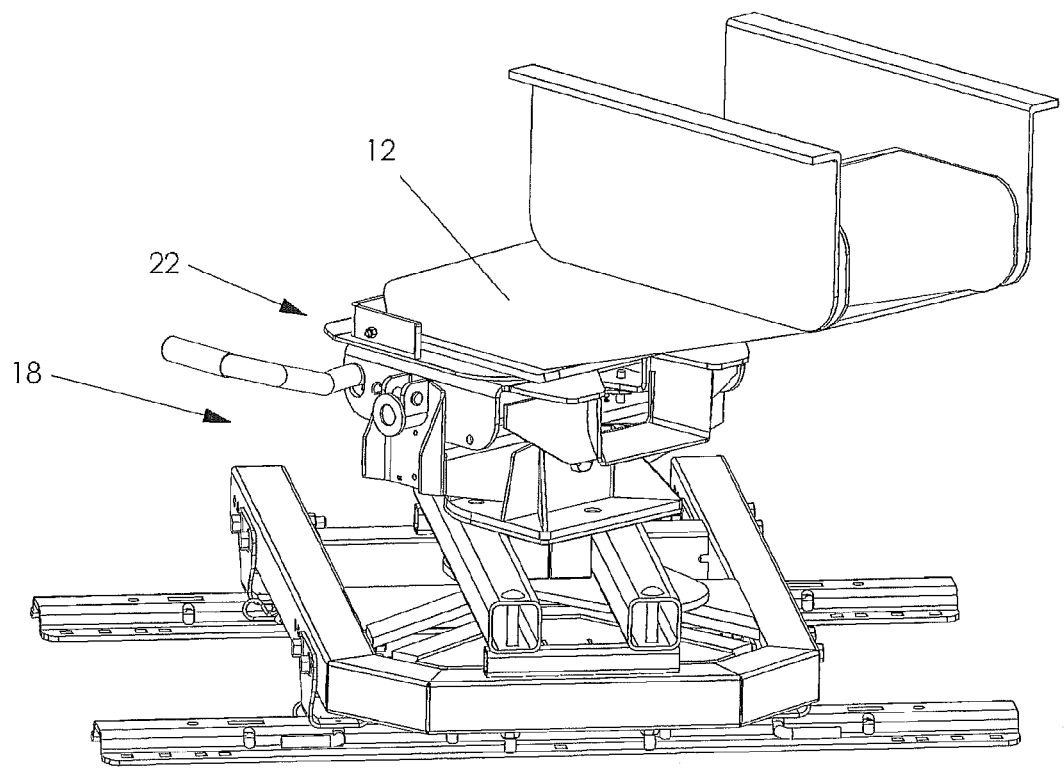
FIG. 2 is a perspective view of the sliding hitch assembly, with the capture plate and pin box mounted on top.
Figure 3:
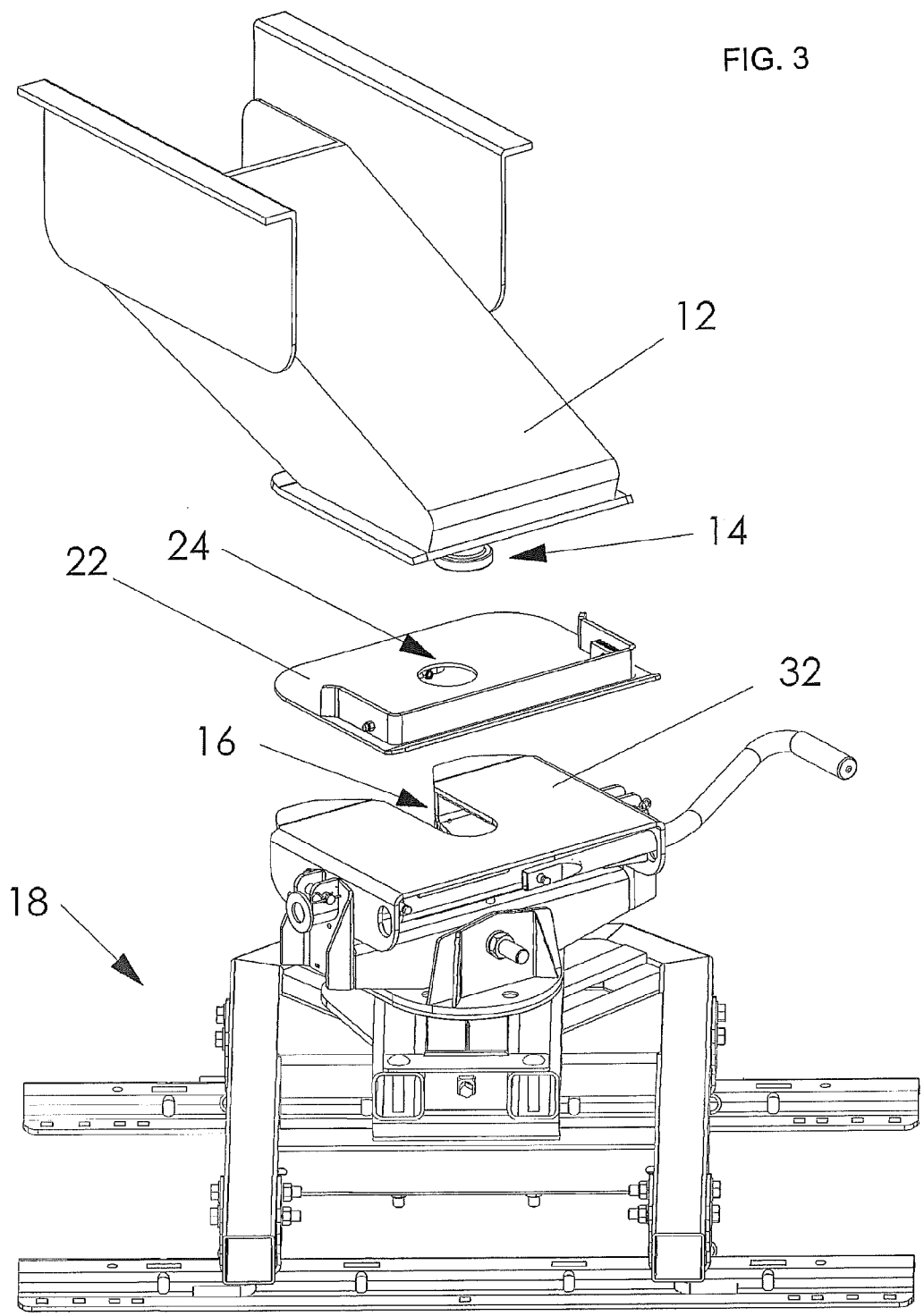
FIG. 3 is an exploded view of the pin box, capture plate and sliding hitch assembly.
Figure 4:
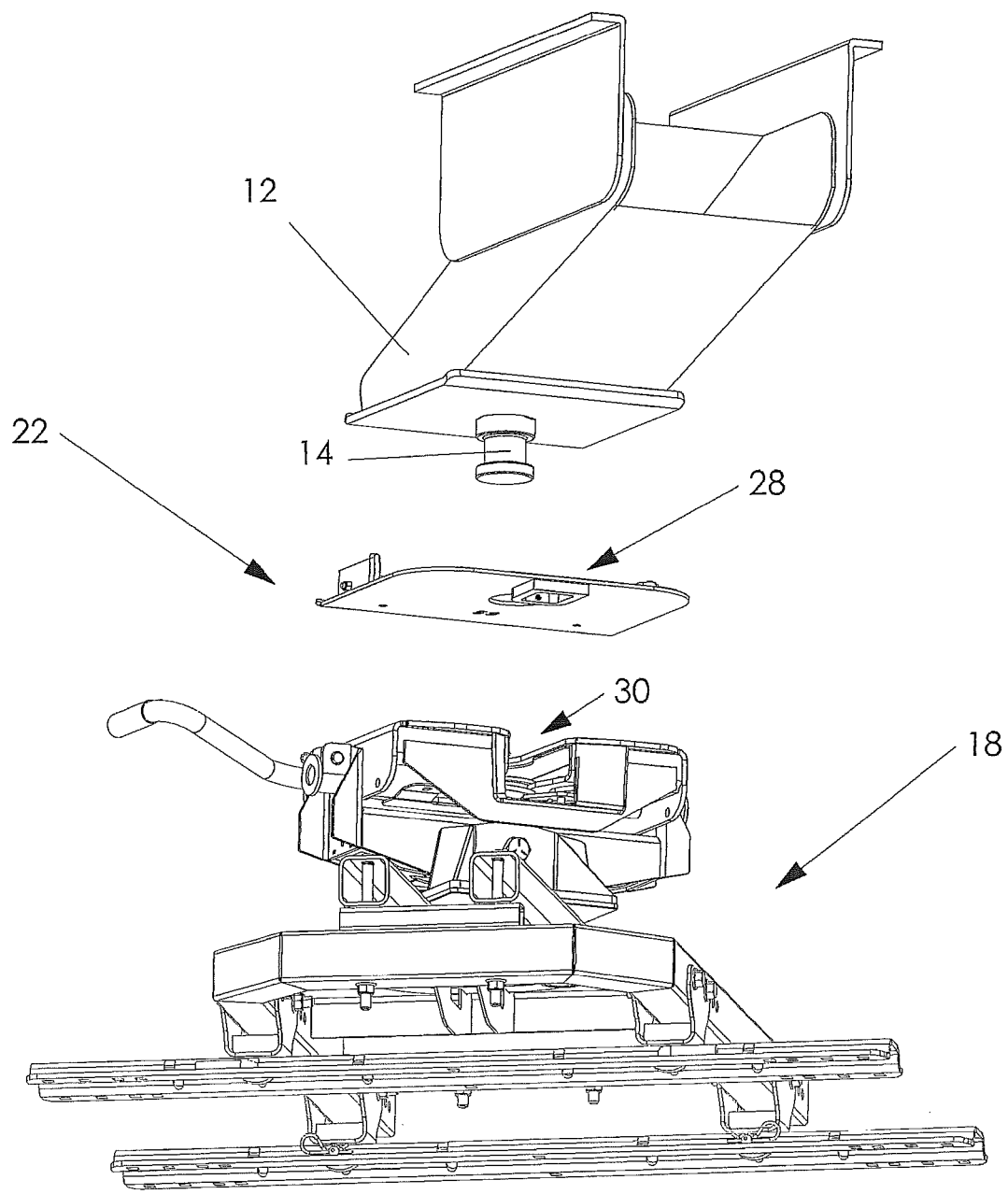
FIG. 4 is an exploded view as seen from below of the pin box, capture plate and sliding hitch assembly.

The pin box 12 is mounted on sliding hitch assembly 18 with a capture plate 22 sandwiched therebetween, as shown in FIG. 2. FIG. 3 shows an exploded view of pin box 12, capture plate 22 and sliding hitch assembly 18. With capture plate 22 anchored to pin box 12, king pin 14 passes through a pin hole 24 in capture plate 22 and is secured in locking jaw 16 on sliding hitch assembly 18, thereby connecting trailer 10 to sliding hitch assembly 18. A lip 26 restricts rotation between pin box 12 and capture plate 22, and a wedge 28 restricts rotation between the capture plate and hitch assembly 18, as discussed in more detail below.

Figure 5:
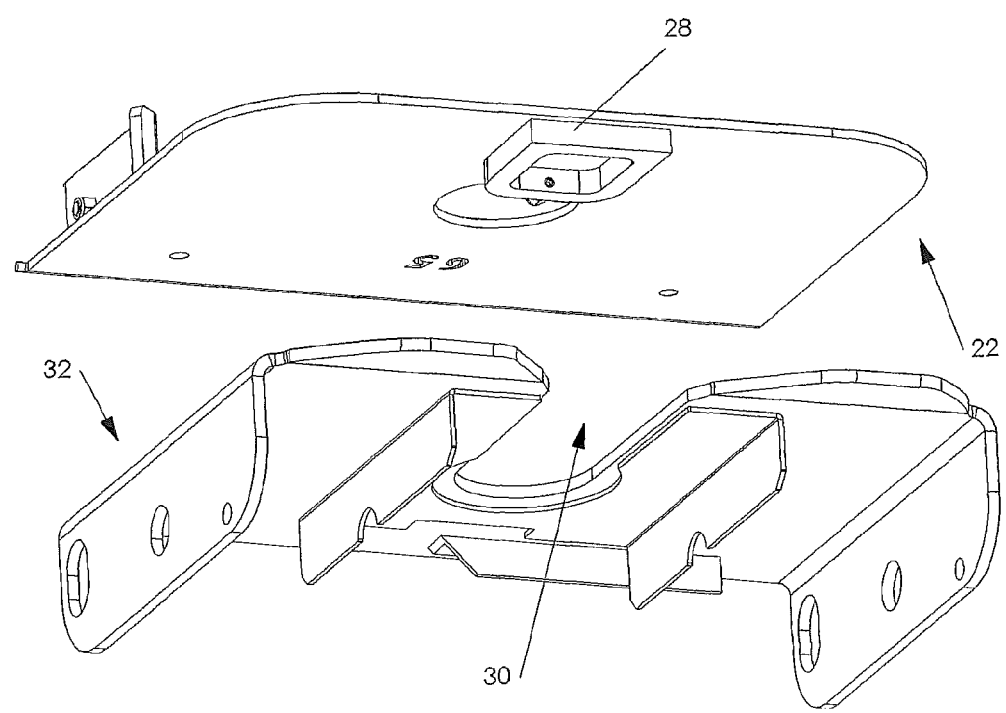
FIG. 5 is an exploded view of the capture and hitch plates.
Figure 6:
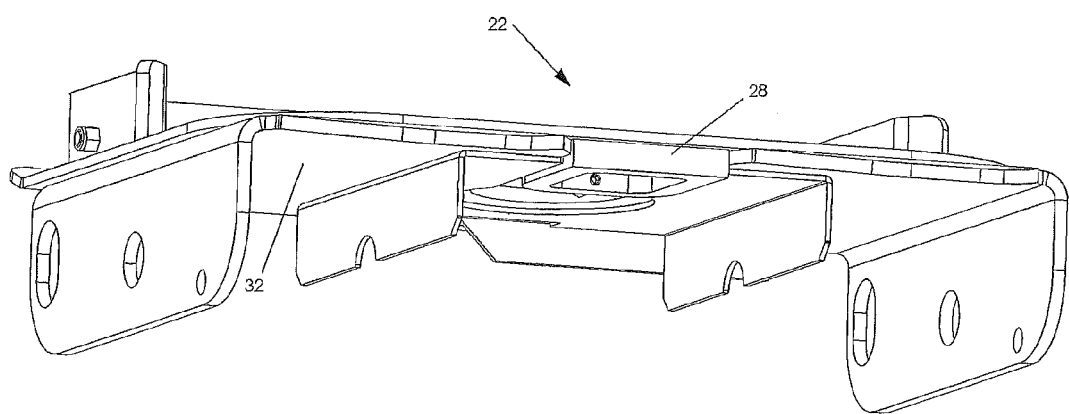
FIG. 6 is a perspective view of the capture plate mated to the hitch plate.
Figure 7:
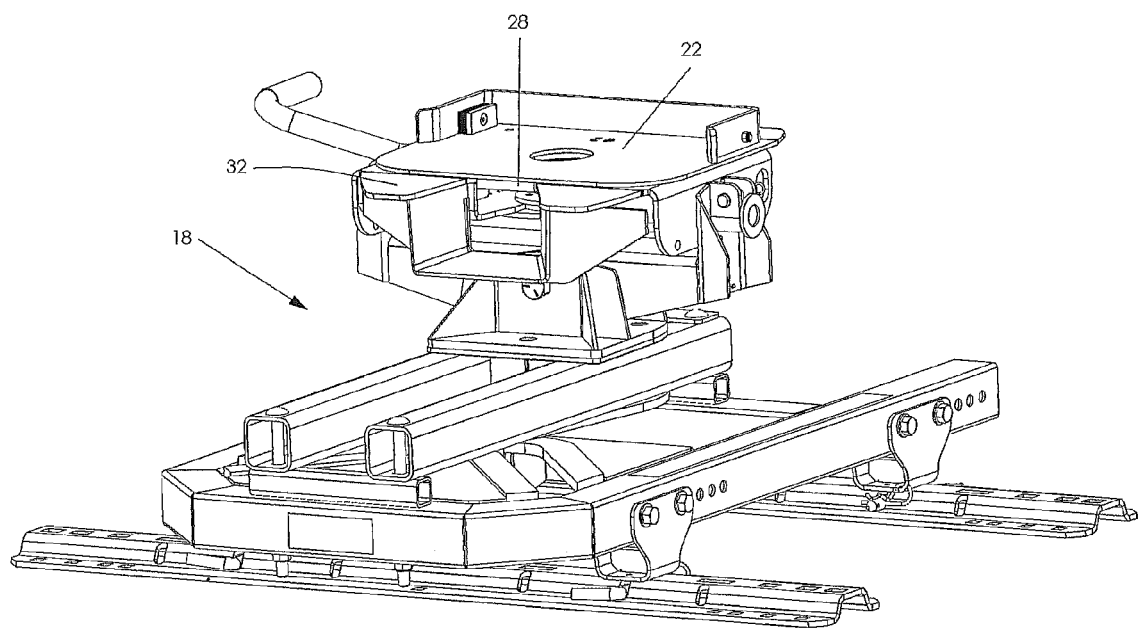
FIG. 7 is a perspective view of the capture plate mounted on the sliding hitch assembly.
Figure 9:
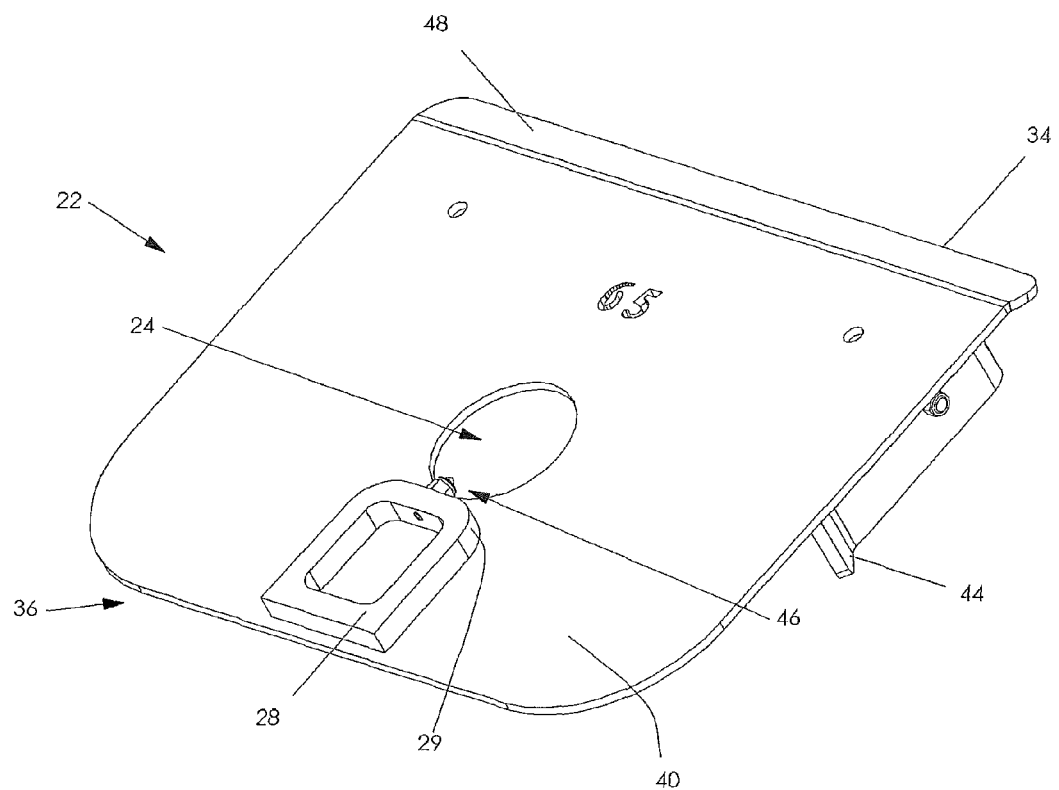
FIG. 9 is a perspective view of the bottom side of the capture plate.
Figure 10:
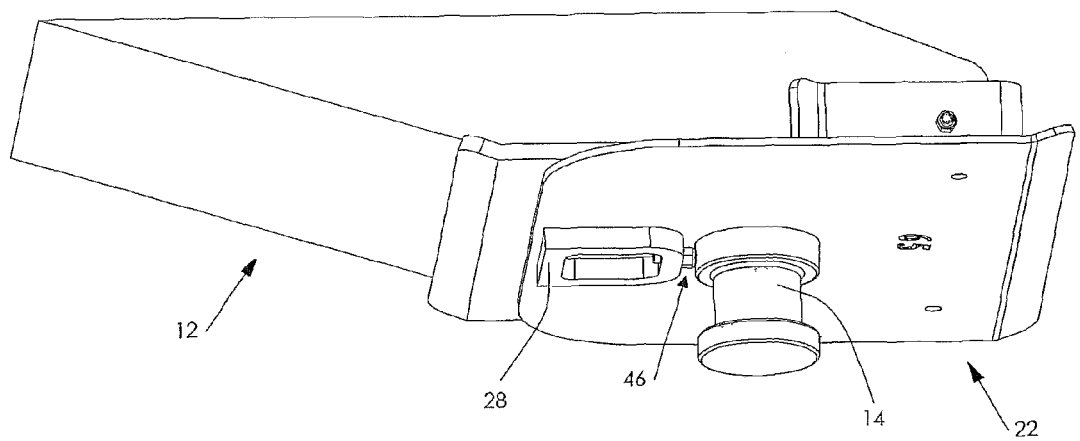
FIG. 10 is a fragmentary view of the pin box engaged with the capture plate shown secured to the king pin by a fastener.

A hitch plate 32 forms the top of sliding hitch assembly 18 and has a pin slot 30. Pin slot 30 is defined as an open channel which accepts king pin 14 and houses a locking jaw 16 which locks king pin 14 in place when the trailer is docked on the sliding hitch assembly. Wedge 28 is fixed to the bottom of capture plate 22 and is sized to mate with pin slot 30. Wedge 28 fits restrictively into pin slot 30 near locking jaw 16 on sliding hitch assembly 18, whereby rotation is prevented between capture plate 22 and sliding hitch assembly 18 as shown in FIGS. 5, 6 and 7. Wedge 28 may have a tapered leading edge 29, as shown in FIG. 9, such that the tapered edge serves to guide the wedge into pin slot 30 as capture plate 22 is docked on sliding hitch assembly 18.

Figure 8:
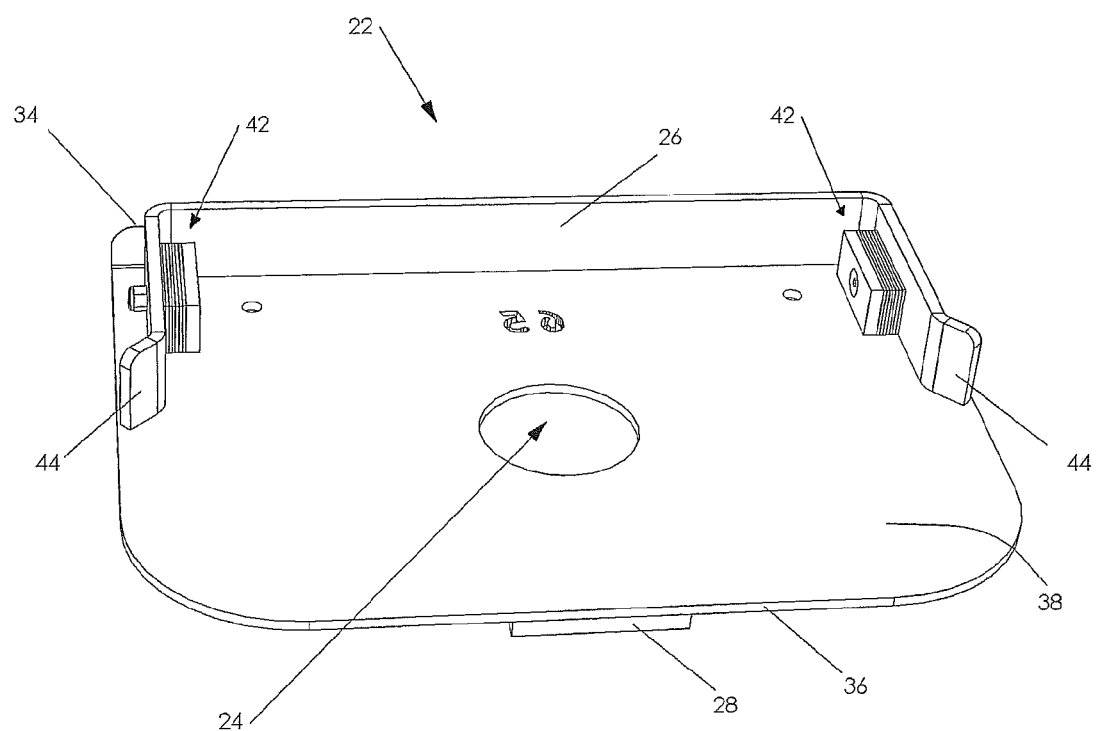
FIG. 8 is a perspective view of the top side of the capture plate.
Figure 11:
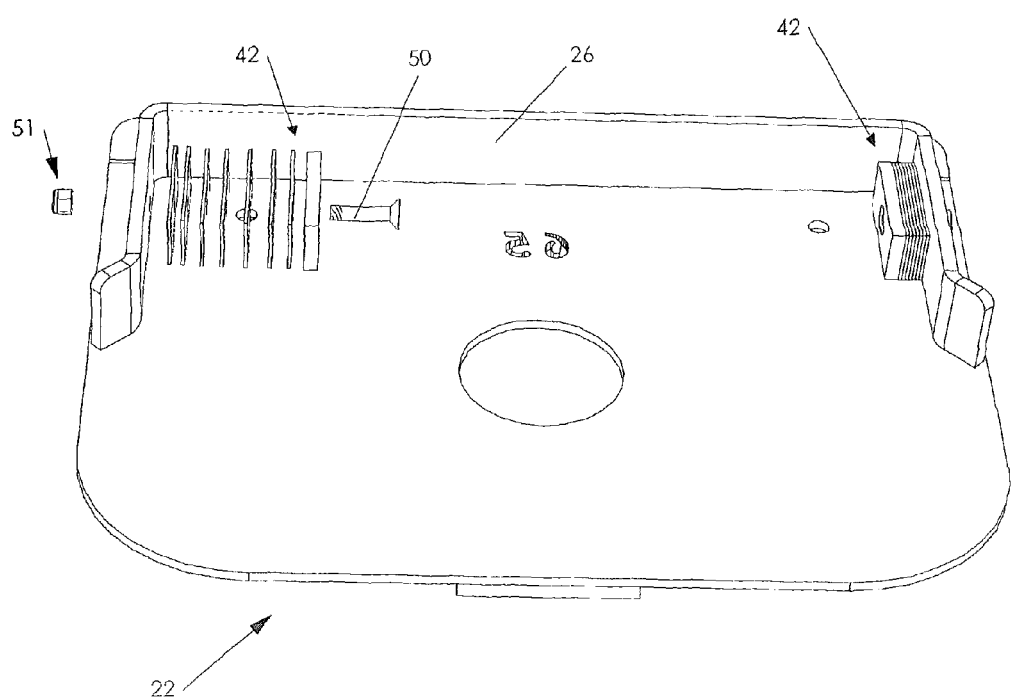
FIG. 11 is a top side perspective view of the capture plate with its spacing shims in exploded form.
Figure 12:
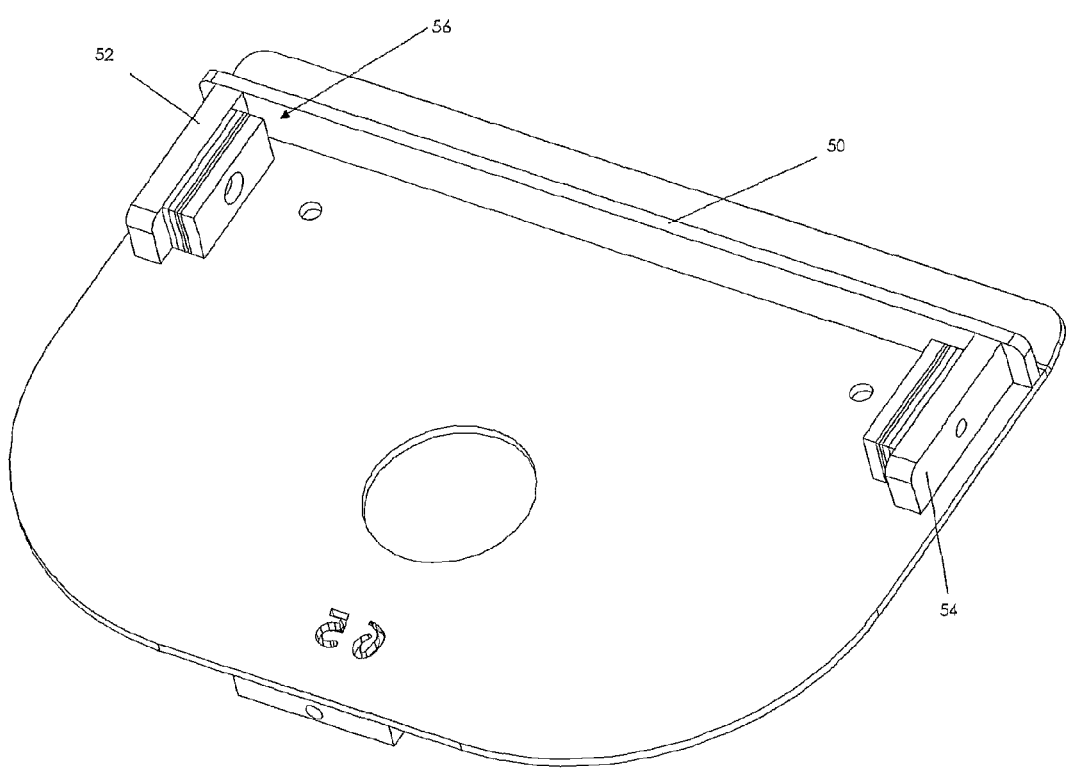
FIG. 12 is an alternative embodiment of the capture plate.
Figure 13:
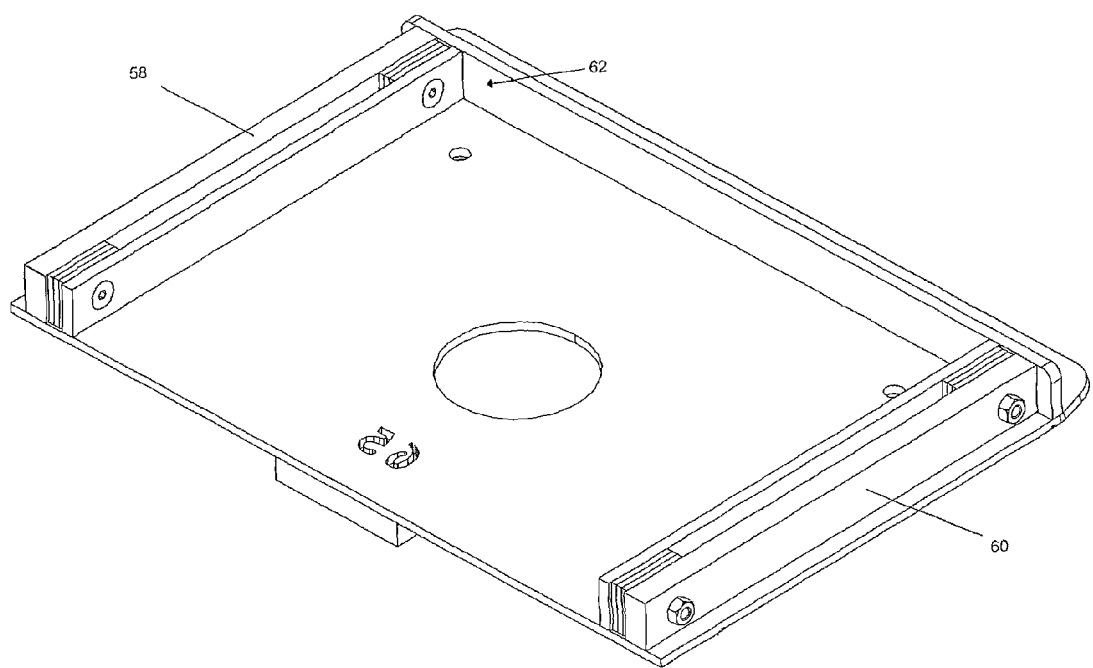
FIG. 13 is an alternative embodiment of the capture plate.

Capture plate 22 is formed from a generally flat plate with pin hole 24 forming an aperture through the plate which accepts king pin 14 as shown in FIGS. 8-11. Capture plate 22 has a front edge 34, a back edge 36, a top side 38 and a bottom side 40. Wedge 28 extends from bottom side 40, preferably positioned between back edge 36 and pin hole 24. Lip 26 extends from top side 38 and is located around a portion of the perimeter of capture plate 22, preferably around front edge 34. FIG. 8 shows lip 26 traveling around nearly the front half of capture plate 22. Other embodiments envision various lip configurations such as lip 26 terminating near back edge back edge 36, or extending only far enough to accommodate shims 42, as shown in FIG. 12 and FIG. 13 respectively. Other embodiments envision lip configurations which restrict rotation between the pin box and the capture plate such as the use of multiple lips, or a lip contacting the back portion of the pin box or other similar configurations.

In one embodiment, lip 26 runs generally parallel to the outer edges of the top side 38 of capture plate 22. Lip 26 circumscribes a sufficient part of pin box 12 so that rotation is prevented between pin box 12 and capture plate 22 as shown in FIG. 13. The outer dimensions of pin box 12 may vary among trailer manufacturers and therefore one or more shims 42 may be secured to lip 26 to accommodate different pin boxes, thereby allowing a restricted fit between capture plate 22 and pin box 12 such that rotation is prevented therebetween as discussed in more detail below. With capture plate 22 mounted on pin box 12, top side 38, lip 26 and any shims 42 contact pin box 12. Lip 26 may terminate in a flared end 44, as shown in FIG. 8.

Shims 42 are defined as one or more spacers which may be mounted to lip 26 in order to custom fit capture plate 22 to pin box 12. Shims 42 can be secured to lip 26 by a fastening means known in the art. Here, a bolt 50 passes through a hole in each shim 42 and through a corresponding hole in lip 26 and then secures into a nut 51. The number of shims 42 shown in FIG. 11 is merely illustrative; the number of shims used in practice will depend on the dimensions of the pin box to which the capture plate is attached to allow for connection between the pin box and the capture plate.

Lip 26 is attached to capture plate 22 with a fail-safe bond such that the lip may preferentially fail before the rotational force between trailer 10 and vehicle 20 becomes great enough to damage any of the attached components such as pin box 12, trailer 10, sliding hitch assembly 18 or vehicle 20. Lip 26 is designed to fail by bending outwardly or separating from capture plate 22 when subjected to a sufficient rotational force, thus allowing pin box 12 to rotate relative to capture plate 22.

Wedge 28 is an extension of capture plate 22 adapted for mating with pin slot 30. As discussed above, wedge 28 mates with pin slot 30 of hitch assembly 18 to prevent rotation between capture plate 22 and the hitch assembly. Wedge 28 may be fixed to capture plate 22 by any method known in the art, including, but not limited to, welding, riveting, bolting, or any other fastener as is known in the art. Alternatively, wedge 28 and capture plate 22 may be formed as a single piece. Wedge 28 is shaped to contact pin slot 30 to prevent rotation of the capture plate relative to the hitch assembly. A fastener, such as a set screw 46, is carried on the underside of capture plate 22, and serves to anchor capture plate 22 to pin box 12, preferably to king pin 14. With set screw 46 tightened against king pin 14, capture plate 22 is held in anchored contact with pin box 12. Fastener 46 is designed as a quick-release fastener for readily attaching and detaching capture plate 22 to pin box 12 without damaging or modifying the pin box. Fastener 46 is an improvement over the prior art as it allows attachment of a capture plate to a pin box without modifying the pin box, and does so with a single quick-release fastener. In the preferred embodiment, fastener 46 is carried by wedge 28. In the preferred embodiment, wedge 28 is fixed to the bottom side 40 of capture plate 22 between pin hole 24 and back edge 36 as shown in FIG. 9. Wedge 28 may take many shapes; in one embodiment wedge 28 is a hollow D-shaped extension of capture plate 22, with a tapered leading edge 29 to allow for smooth mating with pin slot 30. In a further embodiment, wedge 28 is a solid polygonal extension of capture plate 22. The description herein contemplates other embodiments of wedge 28 which mate with a pin slot to prevent rotation between a capture plate and a hitch assembly, and which carry a quick-release fastener for readily attaching and detaching the capture plate to the pin box without modifying the pin box.

In one embodiment, the front edge 34 of capture plate 22 terminates in an angled portion 48. With capture plate 22 mounted on pin box 12, angled portion 48 serves as a ramped leading edge for engagement with pin slot 30. In an alternative embodiment, lip 50 extends the length of the front edge of the capture plate with arms 52 and 54 extending perpendicular therefrom, as shown in FIG. 12. One or more shims 56 may be secured to arms 52 and 54. In this embodiment, arms 52 and 54 are shorter in length than the embodiment shown in FIG. 8, being just long enough to accommodate shims 56. Another embodiment of the invention has arms 58 and 60 extending from near the front edge to near the back edge of the capture plate with shims 62 sized to fit the length of arms 58 and 60, as shown in FIG. 13.

What is claimed is:

1. A capture plate for use in combination with a pin box and a fifth-wheel trailer hitch, said pin box is joined to a trailer and includes a king pin downwardly extending therefrom, said fifth-wheel trailer hitch including a pin slot which is defined as a channel which provides access to a locking jaw, said locking jaw is adapted to releaseably engage said king pin, said capture plate comprising:
   a plate defining an opening for accepting said king pin;
   a wedge extends from said plate, said wedge is sized to mate within said pin slot; and
   a single fastener removably secures said capture plate to said pin box, said single fastener is carried by said wedge and is secured against said king pin.

2. The capture plate as claimed in claim 1, wherein said wedge includes a tapered leading edge to facilitate seating of said wedge within said pin slot.

3. The capture plate as claimed in claim 2, wherein said wedge is D-shaped.

4. The capture plate as claimed in claim 3, wherein said wedge is spaced rearwardly of said opening.

5. The capture plate as claimed in claim 1, and a lip extending from said plate, said lip partially circumscribing said pin box and restricting rotation between said capture plate and said pin box, and said pin box is not rotatable relative said trailer.

6. The capture plate as claimed in claim 5, and a shim is joined to said lip to custom fit said lip to said pin box.

7. The capture plate as claimed in claim 6, and said lip having a flared end.

8. The capture plate of claim 1, said plate having a ramped leading edge.

9. A capture plate for use in combination with a pin box and a fifth-wheel trailer hitch, said pin box is joined to a trailer and includes a king pin downwardly extending from the pin box, said fifth-wheel trailer hitch including a pin slot which is defined as a channel which provides access to a locking jaw, said locking jaw is adapted to releaseably engage said king pin, said capture plate comprising:
   a plate defining an opening for accepting said king pin;
   a wedge extends from said plate, said wedge is sized to mate within said pin slot, said wedge restricts rotation between said capture plate and said fifth-wheel trailer hitch whereby said trailer and said fifth-wheel trailer hitch are held in rotational alignment by said capture plate;
   a fastener removably secures said capture plate to said pin box, said fastener is carried by said wedge and is secured against said king pin.

10. The capture plate of claim 9, wherein said capture plate is secured to said pin box only by said fastener.

11. The capture plate as claimed in claim 9, wherein said wedge includes a tapered leading edge to facilitate seating of said wedge within said pin slot.

12. The capture plate as claimed in claim 11, wherein said wedge is D-shaped.

13. The capture plate as claimed in claim 12, wherein said wedge is spaced rearwardly of said opening on said capture plate.

14. The capture plate as claimed in claim 9, and a lip extending from said plate, said lip partially circumscribing said pin box and restricting rotation between said capture plate and said pin box.

15. The capture plate as claimed in claim 14, and a shim is joined to said lip to custom fit said lip to said pin box.

16. The capture plate as claimed in claim 15, sand said lip having a flared end.

17. The capture plate of claim 9, said plate having a ramped leading edge.

* * * * *